(12) United States Patent
Roberts

(10) Patent No.: US 9,767,330 B2
(45) Date of Patent: Sep. 19, 2017

(54) DISTANCE DETERMINATION BETWEEN RFID TAGS

(71) Applicant: EMPIRE TECHNOLOGY DEVELOPMENT LLC, Wilmington, DE (US)

(72) Inventor: Michael John Roberts, Jamberoo (AU)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 73 days.

(21) Appl. No.: 14/801,538

(22) Filed: Jul. 16, 2015

(65) Prior Publication Data

US 2017/0017814 A1    Jan. 19, 2017

(51) Int. Cl.
*G06K 7/10*    (2006.01)

(52) U.S. Cl.
CPC ................. *G06K 7/10128* (2013.01)

(58) Field of Classification Search
CPC ......... G06K 7/10128; G06K 19/07309; G06K 19/07318; G06K 19/07327; G06K 19/07336; G06K 19/07345
USPC ....................................................... 340/10.1
See application file for complete search history.

(56) References Cited

U.S. PATENT DOCUMENTS

| 8,446,254 | B2 | 5/2013 | Carrick et al. |
| 8,461,966 | B2 | 6/2013 | Tuttle |
| 8,742,975 | B2 | 6/2014 | Gravelle et al. |
| 8,907,767 | B2 * | 12/2014 | Ozeki ............... H04B 7/10 340/10.1 |
| 9,195,862 | B2 * | 11/2015 | Horst ............. G06K 7/10009 |
| 2005/0191983 | A1 | 9/2005 | Korner |
| 2007/0247254 | A1 | 10/2007 | Hayden |
| 2008/0144493 | A1 | 6/2008 | Yeh |
| 2008/0238630 | A1 * | 10/2008 | Chen ............... G06K 19/0701 340/10.5 |
| 2008/0252424 | A1 | 10/2008 | Maltseff et al. |
| 2011/0109442 | A1 | 5/2011 | Pavlov et al. |

(Continued)

OTHER PUBLICATIONS

"13.56 MHz Passive RFID Device with Anti-Collision Feature," Microchip, pp. 22 (Oct. 18, 2002).

(Continued)

*Primary Examiner* — Hirdepal Singh
(74) *Attorney, Agent, or Firm* — Turk IP Law, LLC

(57) ABSTRACT

Technologies are generally described for distance determination between two or more RFID tags based on a minimum detectable signal. In some examples, a first RFID tag may establish communication with a second RFID tag, and modulate an irradiating electromagnetic field to generate backscatter signals for sequential transmission to the second RFID tag. A depth of amplitude modulation of each transmitted signal may be progressively reduced until the second RFID tag can no longer detect the modulation. The particular distance between the first and second RFID tags may then be determined based on a minimum detectable signal by the second RFID tag, which may be identified as a last transmitted signal detected by the second RFID tag. In some embodiments, distance determination between two or more RFID tags as described above may be implemented for robotic sensing, assembly systems, security, and wearable technology to track motion and/or position of objects.

19 Claims, 8 Drawing Sheets

(56) References Cited

U.S. PATENT DOCUMENTS

| | | |
|---|---|---|
| 2011/0223931 A1 | 9/2011 | Buer et al. |
| 2013/0038428 A1 | 2/2013 | Viikari et al. |
| 2013/0093569 A1* | 4/2013 | Sano .................. G06K 7/10207 340/10.1 |
| 2013/0300542 A1* | 11/2013 | Hansen .................... G07C 1/24 340/10.1 |
| 2014/0125461 A1* | 5/2014 | Liao .......................... G01S 5/02 340/10.1 |
| 2014/0167918 A1* | 6/2014 | Stern .................... G06K 7/0095 340/10.1 |
| 2014/0180479 A1 | 6/2014 | Argue et al. |
| 2014/0240088 A1* | 8/2014 | Robinette .......... G08B 13/1427 340/5.61 |
| 2014/0361903 A1* | 12/2014 | Sawada .................. G01V 15/00 340/686.6 |
| 2015/0108210 A1 | 4/2015 | Zhou |
| 2015/0186693 A1* | 7/2015 | Blair .................. G06Q 10/0833 340/10.1 |
| 2016/0104013 A1* | 4/2016 | Fessler .................... G01R 25/00 340/10.1 |

OTHER PUBLICATIONS

"Advanced RFID Measurements: Basic Theory to Protocol Conformance Test," pp. 1-14, (Dec. 19, 2013).
"MCRF355 Data Sheet," Microchip, pp. 22 (Aug. 24, 2005).
Wanggen, S., et al., "Design of an ultra-low-power digital processor for passive UHF RFID tags," Journal of Semiconductors, vol. 30, No. 4, pp. 045004-1-045004-4 (Apr. 2009).
"NFC Forum Type 2 Tag compliant IC with 144 bytes user memory and field detection," Product data sheet company public, pp. 1-32, (Sep. 10, 2013).
"Power Management Solutions for Ultra-Low-Power 16-Bit MSP430TM MCU," Texas Instruments, pp. 3, (2012).
Buettner, M., et al., "Revisiting Smart Dust with RFID Sensor Networks," pp. 1-6, (2008).
Donno, D.D., et al., "An UHF RFID Energy-Harvesting System Enhanced by a DC-DC Charge Pump in Silicon-on-Insulator Technology," IEEE Microwave and Wireless Components Letters, vol. 23, No. 6, pp. 315-317, (Jun. 2013).
Liu, D., et al., "Design and implementation of a RF powering circuit for RFID tags or other batteryless embedded devices," Sensors, vol. 14, Issue 8, pp. 14839-14857, (Aug. 13, 2014).
Nikitin, P.V., et al., "Passive Tag-to-Tag Communication," 2012 IEEE International Conference on RFID, pp. 224-231 (Apr. 3-5, 2012).
Sample, A.P., et al., "Design of a Passively-Powered, Programmable Sensing Platform for UHF RFID Systems," IEEE International Conference on RFID, pp. 149-156, (Mar. 26-28, 2007).
Sample, A.P., et al., "Design of an RFID-Based Battery-Free Programmable Sensing Platform," IEEE Transactions on Instrumentation and Measurement, vol. 57, Issue 11, pp. 2608-2615, (Nov. 2008).
Sorells, P., "Passive RFID Basics," Microchip Technology Inc, pp. 1-5 (Jan. 18, 2002).
International Search Report and Written Opinion for International Patent Application No. PCT/US2016/033881 mailed Sep. 2, 2016, pp. 10.

\* cited by examiner

COMPUTER PROGRAM PRODUCT 800

SIGNAL-BEARING MEDIUM 802

804 ONE OR MORE INSTRUCTIONS TO

AT A FIRST RFID TAG, ESTABLISH COMMUNICATION WITH A SECOND RFID TAG THAT IS SEPARATED FROM THE FIRST RFID TAG BY A PARTICULAR DISTANCE;
TRANSMIT A PLURALITY OF SIGNALS SEQUENTIALLY TO THE SECOND RFID TAG, WHERE EACH SIGNAL IS TRANSMITTED AT A REDUCED STRENGTH FROM A RESPECTIVE PREVIOUS SIGNAL;
RECEIVE A CONFIRMATION FROM THE SECOND RFID TAG FOLLOWING TRANSMISSION OF EACH SIGNAL THAT INDICATES THE TRANSMITTED SIGNAL IS DETECTABLE BY THE SECOND RFID TAG;
IN RESPONSE TO A FAILURE TO RECEIVE THE CONFIRMATION FROM THE SECOND RFID TAG, IDENTIFYING A LAST TRANSMITTED SIGNAL FOR WHICH A CONFIRMATION WAS RECEIVED AS A MINIMUM DETECTABLE SIGNAL BY THE SECOND RFID TAG; AND DETERMINE THE PARTICULAR DISTANCE BETWEEN THE FIRST RFID TAG AND THE SECOND RFID TAG BASED ON THE MINIMUM DETECTABLE SIGNAL.

| COMPUTER-READABLE MEDIUM 806 | RECORDABLE MEDIUM 808 | COMMUNICATIONS MEDIUM 810 |

FIG. 8

DISTANCE DETERMINATION BETWEEN RFID TAGS

BACKGROUND

Unless otherwise indicated herein, the materials described in this section are not prior art to the claims in this application and are not admitted to be prior art by inclusion in this section.

Radio frequency identification (RFID) systems, including an RFID reader and one or more RFID tags, may be useful in product-related and service-related industries for tracking various objects, for example. The RFID tags may be passive RFID tags that have no internal power source. As such, the RFID tags may harvest energy from electromagnetic radiation provided by an external field generator, such as the RFID reader, to power tag operations.

Recent experiments indicate that a RFID tag may be able to communicate directly with one or more other RFID tags within a close proximity of the RFID tag. Furthermore, the RFID tag may even be able to harvest sufficient power to operate an ultra-low power processor, which may have significant applications for robotic sensing, packaging conveyor systems, assembly systems, security systems, and wearable technology, among other examples.

SUMMARY

The present disclosure generally describes techniques for distance determination between radio frequency identification (RFID) tags.

According to some examples, methods to determine a distance between RFID tags are provided. An example method includes at a first RFID tag, establishing communication with a second RFID tag that is separated from the first RFID tag by a particular distance, transmitting a plurality of signals sequentially to the second RFID tag, where each signal is transmitted at a reduced strength compared to a respective previous signal, and receiving a confirmation from the second RFID tag following the transmission of each signal that indicates the transmitted signal is detectable by the second RFID tag. The example method further includes in response to a failure to receive the confirmation from the second RFID tag, identifying a last transmitted signal for which a confirmation was received as a minimum detectable signal by the second RFID tag, and determining the particular distance between the first RFID tag and the second RFID tag based on the minimum detectable signal.

According to other examples, RFID tags may be described. An example RFID tag may include an antenna configured to receive a RF field generated by an external field generator, a demodulator configured to extract energy for tag operations from the received RF field, and a controller. The controller may be configured to establish communication with another RFID tag that is separated from the RFID tag by a particular distance, transmit a plurality of signals sequentially to the other RFID tag, where each signal is transmitted at a reduced depth of amplitude modulation compared to a respective previous signal, and receive a confirmation from the other RFID tag following the transmission of each signal that indicates the transmitted signal is detectable by the other RFID tag. The controller may also be configured to identify a last transmitted signal for which a confirmation was received as a minimum detectable signal by the other RFID tag in response to a failure to receive the confirmation from the other RFID tag, and determine the particular distance between the RFID tag and the other RFID tag based on the minimum detectable signal.

According to further examples, systems to determine a distance between radio frequency identification (RFID) tags are described. An example system may include a reader, a first RFID tag, and a second RFID tag. The first RFID tag may include a first antenna configured to receive a radio frequency (RF) field, a demodulator configured to extract energy for tag operations from the received RF field, and a first controller. The first controller may be configured to establish communication with a second RFID tag that is separated from the first RFID tag by a particular distance, transmit a plurality of signals sequentially to the second RFID tag, where each signal is transmitted at a reduced depth of amplitude modulation compared to a respective previous signal, and receive a confirmation from the second RFID tag following the transmission of each signal that indicates the transmitted signal is detectable by the second RFID tag. The first controller may also be configured to identify a last transmitted signal for which a confirmation was received as a minimum detectable signal by the second RFID tag in response to a failure to receive the confirmation from the second RFID tag, and determine the particular distance between the first RFID tag and the second RFID tag based on the minimum detectable signal. The second RFID tag may include a second antenna configured to receive the RF field and the plurality of signals transmitted from the first RFID tag at varying depths of amplitude modulation, and a second controller configured to send the confirmation to the first RFID tag in response to a determination that the transmitted signal is detectable by the second RFID tag.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 illustrates a block diagram of an example computer program product, all arranged in accordance with at least some embodiments described herein.

DETAILED DESCRIPTION

Figure 1:
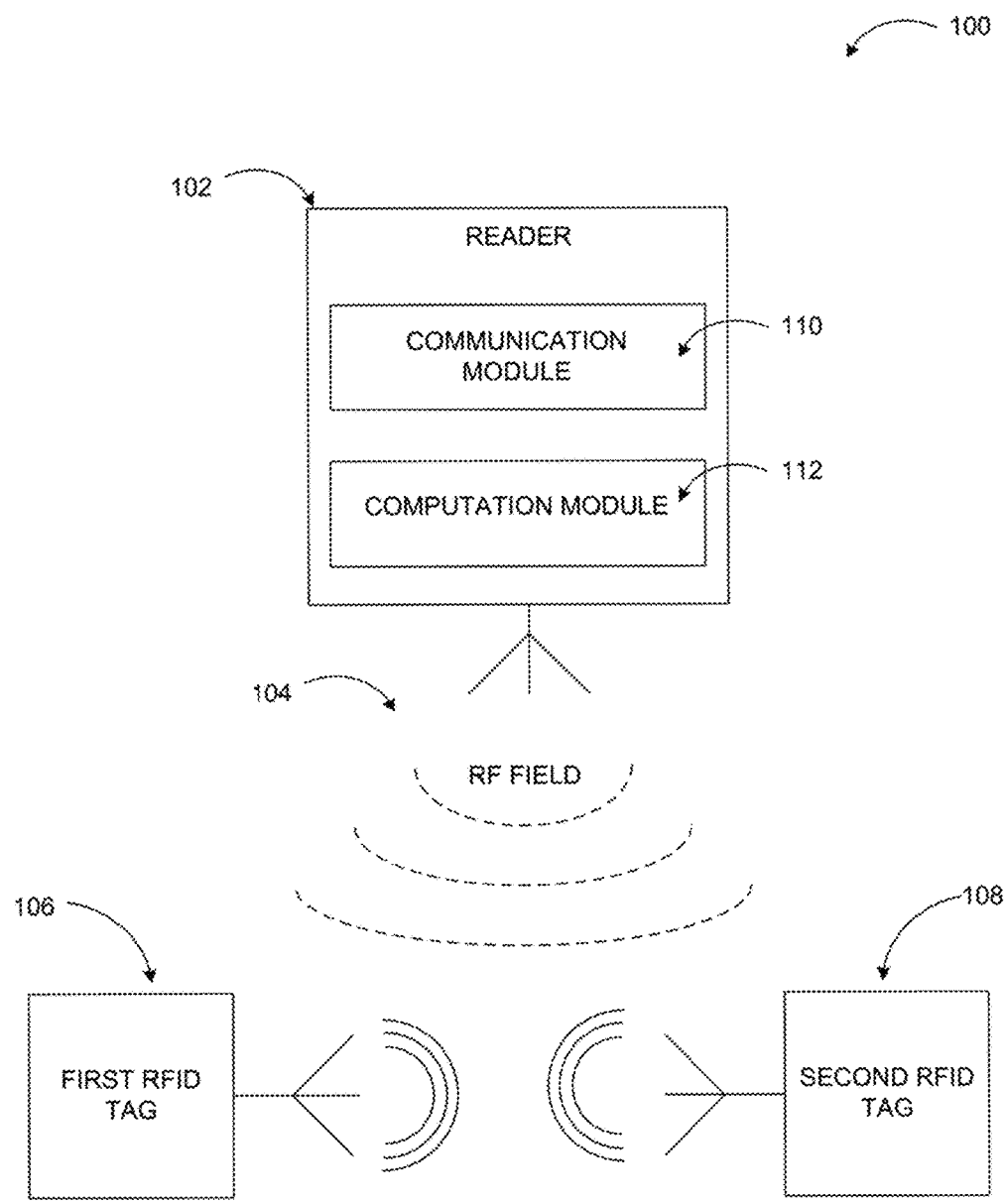
FIG. 1 illustrates an example system configured to enable distance determination between radio frequency identification (RFID) tags.

In the following detailed description, reference is made to the accompanying drawings, which form a pan hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to methods, apparatus, systems, devices, and/or computer program products related to distance determination between radio frequency identification (RFID) tags.

Briefly stated, technologies are generally described for distance determination between two or more RFID tags based on a minimum detectable signal. For example, a first RFID tag may establish communication with a second RFID tag, and modulate an irradiating electromagnetic field to generate backscatter signals for sequential transmission to the second RFID tag. In some embodiments, the backscatter signals may be continuously generated. A depth of amplitude modulation of each transmitted signal may be progressively reduced until the second RFID tag can no longer detect the modulation. The particular distance between the first and second RFID tags may then be determined based on a minimum detectable signal by the second RFID tag, which may be identified as a last transmitted signal detected by the second RFID tag. In some embodiments, distance determination between two or more RFID tags as described above may be implemented for robotic sensing, assembly systems, security, and wearable technology to track motion and/or position of objects.

FIG. 1 illustrates an example system configured to enable distance determination between RFID tags, arranged in accordance with at least some embodiments described herein.

As shown in a diagram 100, an example system may include a reader 102 and one or more RFID tags, such as a first RFID tag 106 and a second RFID tag 108. In some examples, the RFID tags may be passive RFID tags. The reader 102 may include a communication module 110 and a computation module 112, among other modules. The reader 102 may be configured to generate a radio frequency (RF) field 104, in which the first RFID tag 106 and the second RFID tag 108 are bathed. In alternate examples, an external field generator other than the reader 102 may be configured to generate the RF field 104.

In an example embodiment, the first RFID tag 106 may be a transmitting tag and the second RFID tag 108 may be a receiving tag. The first RFID tag 106 may include, among other components, an antenna configured to receive the RF field 104 generated by the reader 102, a demodulator configured to extract and store energy for tag operations from the RF field 104, and a controller configured to execute the tag operations, for example. The ability of the first RFID tag 106 to extract and store energy from the RF field 104 for tag operations, such as distance determination, information storage and processing, modulation and demodulation of signals, and signal transmission, among other examples, may be valuable as the system may require no external power source and/or wiring.

To determine a particular distance between the first RFID tag 106 and the second RFID tag 108, the controller may establish communication with the second RFID tag 108, where the first RFID tag 106 and the second RFID tag 108 may agree to detect a minimum detectable signal. In some examples, the first RFID tag 106 and the second RFID tag 108 may be constantly searching for a sequence which indicates distance measurement is about to be attempted. In the embodiments described herein, collision avoidance may not be problematic because the inter tag signaling between the first RFID tag 106 and second RFID tag 108 is weak. However, as controllers of the first RFID tag 106 and the second RFID tag 108 begin to use less and less power, collision avoidance may become more problematic. Employment of code division multiple access (CDMA) techniques may help with collision avoidance, where the first RFID tag 106 and the second RFID tag 108 may send information simultaneously over a single communication channel. The controller of the first RFID tag 106 may then transmit a plurality of signals sequentially to the second RFID tag 108. In some examples, the signals may be backscatter signals generated from modulation of the RF field 104, where each signal may be transmitted at a reduced strength compared to a respective previous signal. For example, a depth of amplitude modulation at which each signal is transmitted may be reduced. The reduced depth of amplitude modulation may be achieved by employing a pulse width modulation (PWM) to vary duty cycles of a modulator of the first RFID tag 106, for example, which is described in greater detail below in conjunction with FIG. 2.

The controller of the first RFID tag 106 may receive a confirmation from the second RFID tag 108 following the transmission of each signal that indicates the transmitted signal is detectable by the second RFID tag 108. For example, as each signal is transmitted with a reduced depth of amplitude modulation, the first RFID tag 106 may ask the second RFID tag, "Can you still detect the modulation?" and the second RFID tag may respond with the confirmation. In response to a failure to receive the confirmation from the second RFID tag 108, the controller of the first RFID tag 106 may identify a last transmitted signal for which a confirmation was received as a minimum detectable signal by the second RFID tag 108. In some embodiments, the first RFID tag 106 may lift a depth level of the amplitude modulation and check again for the minimum detectable signal, where a few iterations may be sufficient to establish a threshold of the minimum detectable signal. For example, the last transmitted signal for which a confirmation was received from the second RFID tag 108 may be re-transmitted to ensure the second RFID tag 108 may still detect it. The controller of the first RFID tag 106 may then communicate the minimum detectable signal to the reader 102, the communication facilitated by the communication module 110 of the reader 102. The computation module 112 of the reader may be configured to determine a strength of the minimum detectable signal in Volts (or millivolts), for example, and convert the strength to units of distance, such as millimeters, to define the particular distance between the first RFID tag 106 and the second RFID tag 108.

In some embodiments, the first RFID tag 106 and the second RFID tag 108 may swap (exchange) roles to determine the distance between the first RFID tag 106 and the second RFID tag 108 in an opposite direction to improve accuracy of the measurement. For example, the second RFID tag 108 may become the transmitting tag and the first RFID tag 106 may become the receiving tag. Similar to the embodiments described above, a controller of the second RFID tag 108 may establish communication with the first RFID tag 106 and transmit a plurality of signals sequentially to the first RFID tag 106, where each signal may be transmitted at a reduced depth of amplitude modulation compared to a respective previous signal. The controller of the second RFID tag 108 may receive a confirmation from the first RFID tag 106 following the transmission of each signal that indicates the transmitted signal is detectable by the first RFID tag 106. In response to a failure to receive the confirmation from the first RFID tag 106, the controller of the second RFID tag 108 may identify a last transmitted signal for which a confirmation was received as a minimum detectable signal by the first RFID tag 106. The controller of the second RFID tag 108 may then communicate the minimum detectable signal to the reader 102, the communication facilitated by the communication module 110 of the reader 102. The computation module 112 of the reader 102 may be configured to determine a strength of the minimum detectable signal and convert the strength to units of distance to define the particular distance between the first RFID tag 106 and the second RFID tag 108. In some examples. The computation module 112 of the reader may average the strengths of the minimum detectable signals by the first RFID tag 106 and the second RFID tag 108 to determine the particular distance between the first RFID tag 106 and the second RFID tag 108.

In some embodiments, various refinements may be employed to convert the strengths of the minimum detectable signals to the units of distance, such as millimeters. In one embodiment, the depth of the amplitude modulation may be characterized as a function of field power, where a correction factor for field strength versus distance may be derived. For example, in a low strength RF field, the receiving tag may be unable to detect the modulation sooner than in a higher strength RF field (for example, causing the strength of the minimum detectable signals to be higher in value). As such, the distance determined may be multiplied by a particular factor which is inversely proportional to the field strength. In another embodiment, the depth of the amplitude modulation versus distance may be measured to determine the PWM duty cycle versus an actual distance in millimeters.

Figure 2:
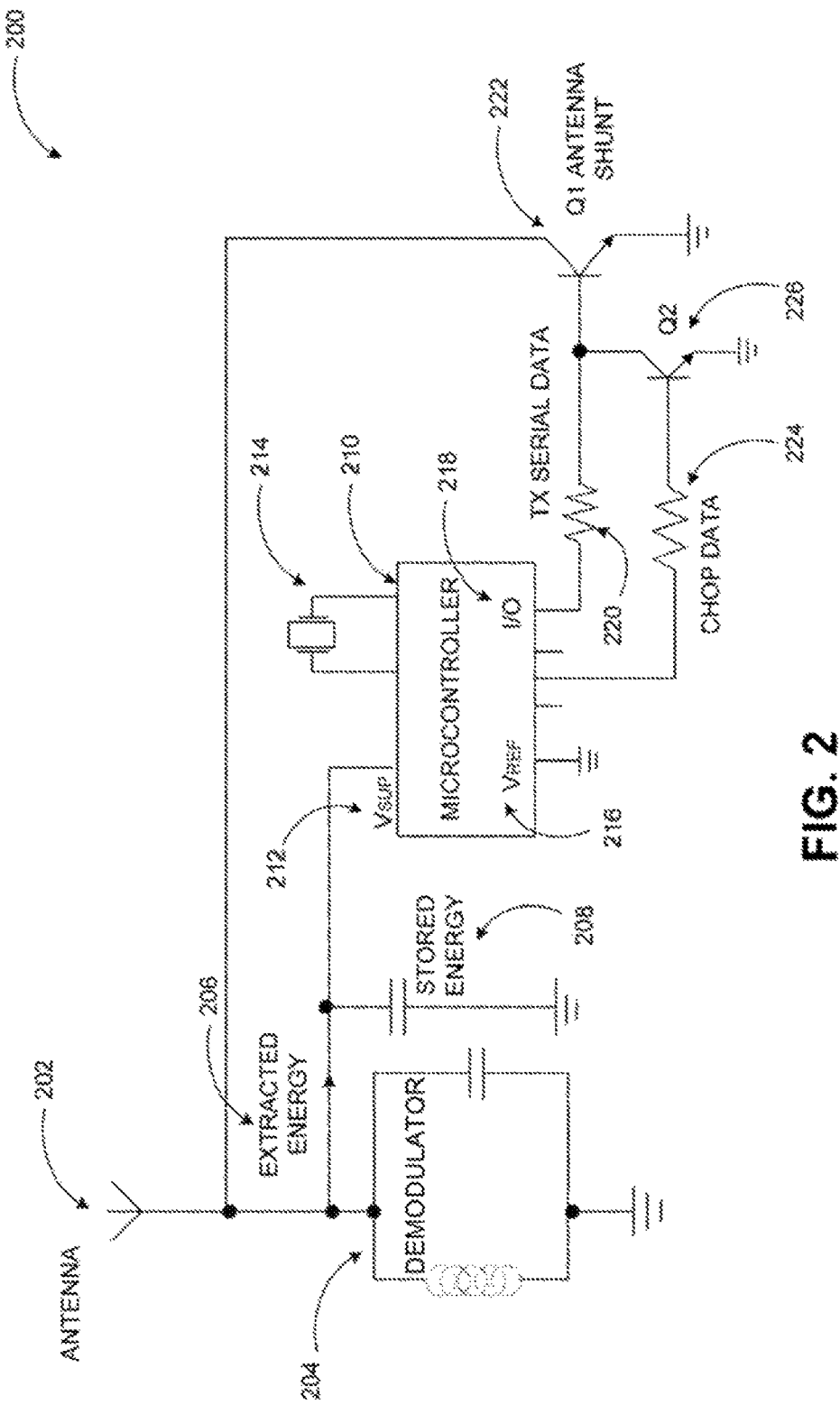
FIG. 2 illustrates a first RFID tag configured to transmit signals to a second RFID tag.

FIG. 2 illustrates a first RFID tag configured to transmit signals to a second RFID tag, arranged in accordance with at least some embodiments described herein.

As shown in diagram 200, the first RFID tag may be a transmitting tag that includes an antenna 202, a demodulator 204, a controller 210, and one or more modulators (for example, 222 and 226), among other components. The antenna 202 may be configured to receive an RF field generated by an external field generator, such as an RFID reader associated with the first RFID tag. The demodulator 204 may be configured to extract energy 206 from the RF field for storage 208 to be used to power tag operations. In some examples, the extracted energy 206 may be rectified to a direct current (DC). The controller 210 may be a microcontroller, for example, configured to perform and/or execute the tag operations. The controller 210 may include one or more power supply ports, such as a port associated with a supply voltage 212 and a port associated with a reference voltage 216, one or more serial and parallel input/output (I/O) ports 218, and an oscillator 214. The oscillator 214 may be configured to convert the DC to an alternating current (AC) signal, which may serve as a clock signal that regulates the RFID tag to cause one or more circuits of the RFID tag to be synchronized. The controller 210 may further include a flash memory and a random-access memory (RAM) configured to store data associated with the RFID tag, and an analog-to-digital converter, among other components. The configuration and components of the first RFID tag illustrated in FIG. 2 are merely illustrative, and are not limited to the examples disclosed herein.

Upon establishing communication with the second RFID tag, the controller 210 may transmit a plurality of signals sequentially to the second RFID tag. In some examples, the signals may be backscatter signals generated from modulation of the RF field, where each signal may be transmitted to the second RFID tag at a reduced depth of amplitude modulation compared to a respective previous signal. For example, the first RFID tag may modulate the RF field by shorting out the antenna 202 with a modulator, such as an antenna shunting transistor (Q1) 222, which switches between high and low impedance. At least one of the I/O ports 218 may output data bits 220 which drive a base of the antenna shunting transistor (Q1) 222. For example, when responding to a reader interrogation, the data bits 220 may drive the antenna shunting transistor (Q1) 222 hard on and off at an appropriate baud rate. In some embodiments, a universal asynchronous receiver/transmitter (uART) may be configured to enable transmission of the individual data bits in a sequential fashion to the antenna shunting transistor (Q1) 222.

As previously discussed, each signal may be transmitted to the second RFID tag at a reduced depth of amplitude modulation compared to a respective previous signal. The depth of amplitude modulation may be varied by imposing a higher speed pattern on the antenna shunting transistor (Q1) 222, where the speed of the pattern may be increased by a factor of about ten, for example. In one embodiment, a PWM may be superimposed on the antenna shunting transistor (Q1) 222. For example, at least one of the I/O ports 218 of the controller 210 may generate a pattern of pulses for the PWM, where a timing of the PWM may be generated by software in the controller 210. The PWM may be received by the antenna shunting transistor (Q1) 222 causing a duty cycle (or an "on" time) of the antenna shunting transistor (Q1) 222 to be varied based on the PWM. In one example, the antenna shunting transistor (Q1) 222 may be 50% on by superimposing a high speed pattern of alternating one and zero bits. A switching pattern of about one megahertz may be used to pulse width modulate the antenna shunting transistor (Q1) 222 resulting in chopped data bits 224. The base of the antenna shunting transistor (Q1) 222 may be gated by a second modulator (Q2) 226. A base of the second modulator may be driven by the PWM signal (that is, the chopped data bits 224) from at least one of the I/O ports 218. For example, the one bits that get chopped are those bits in which the antenna shunting transistor (Q1) 222 is on and the second modulator (Q2) 226 rapidly clamps the base of the antenna shunting transistor (Q1) 222 off and on. The second modulator (Q2) 226 may keep chopping the zero bits as well, but because there is no base voltage present on the antenna shunting transistor (Q1) 222, the chopping does not have an effect.

By varying the duty cycle of the antenna shunting transistor (Q1) 222 through superimposition of the PWM, the amount of amplitude modulation applied to each transmitted signal may be varied, and as such, the depth of amplitude modulation may be varied. The first RFID tag may receive a confirmation from the second RFID tag following the transmission of each signal that indicates the transmitted signal is detectable by the second RFID tag. In response to a failure to receive the confirmation from the second RFID tag, a last transmitted signal for which a confirmation was received may be identified as a minimum detectable signal by the second RFID tag. The distance between the first and second RFID tags may then be determined based on the minimum detectable signal.

Figure 3:
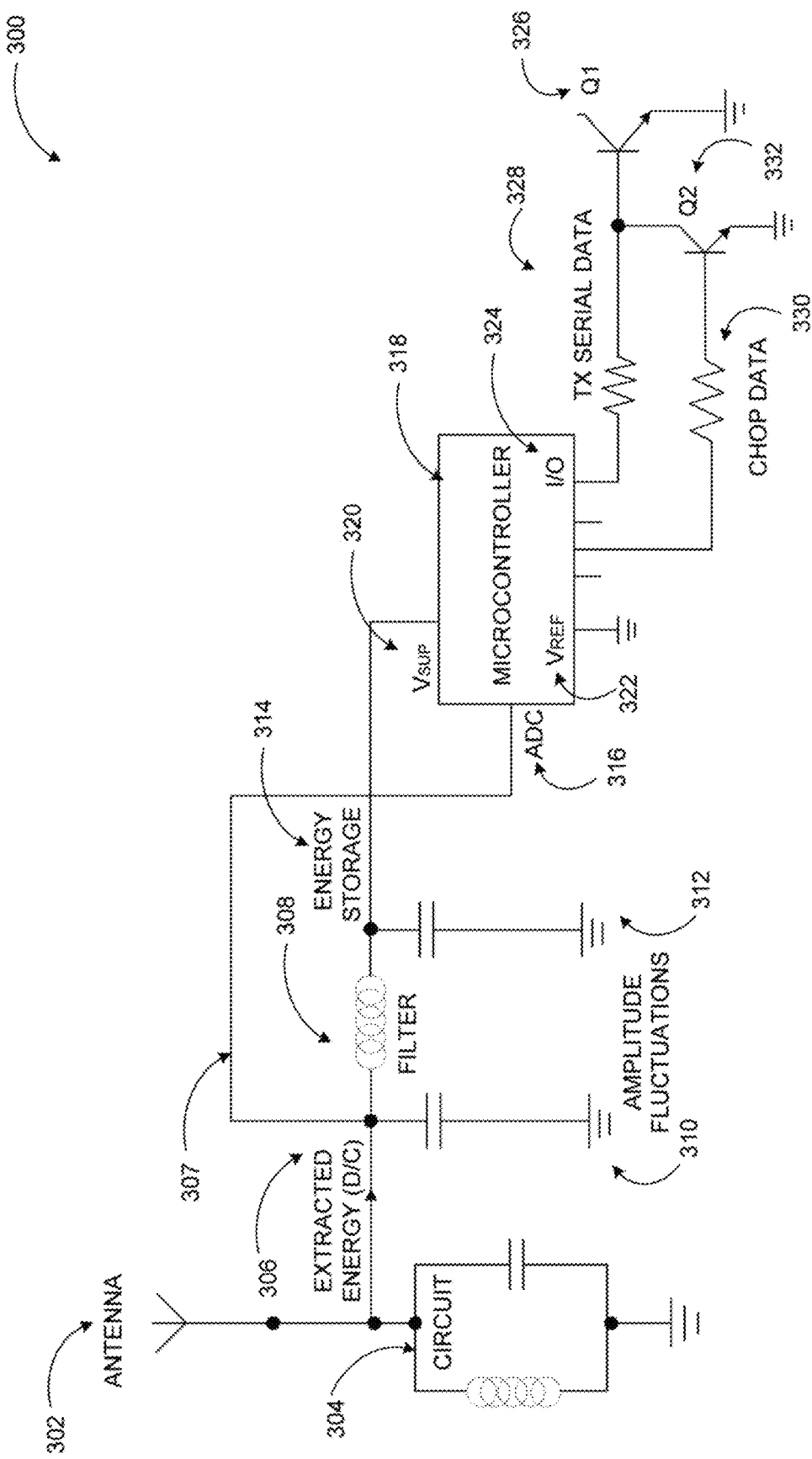
FIG. 3 illustrates a second RFID tag configured to receive signals transmitted from a first RFID tag.

FIG. 3 illustrates a second RFID tag configured to receive signals transmitted from a first RFID tag, arranged in accordance with at least some embodiments described herein.

As shown in diagram 300, the second RFID tag may be a receiving tag that includes similar elements to the first RFID tag described in conjunction with FIG. 2, such as an antenna 302, a demodulator 304, a controller 318, and one or more modulators (for example, 326 and 332), among other components. The controller 318 may be a microcontroller, for example, that includes a flash memory, a RAM, one or more power supply ports, such as a port associated with a supply voltage 320 and a port associated with a reference voltage 322, one or more serial and parallel I/O ports 324, and an ADC 316, among other components. The configuration and components of the second RFID tag illustrated in FIG. 3 are merely illustrative, and are not limited to the examples disclosed herein.

The antenna 302 may be configured to receive an RF field from an external field generator, such as a reader associated with the second RFID tag. The antenna 302 may also be configured to receive the signals transmitted from the first RFID tag at varying depths of amplitude modulation 310, 312, as discussed above in conjunction with FIG. 2. In some embodiments, the second RFID tag may employ a filter 308 to separate the signals received from the first RFID tag based on respective depths of amplitude modulation 310, 312. The demodulator 304 may be configured to extract energy 306 from the received RF field for storage 314 to be used to power tag operations. For example, the extracted energy 306 may be rectified to a direct current (DC). A branch 307 of a DC circuit of the RFID tag may have a small capacitor to cause the voltage to follow an amplitude of the RF field, which may serve as input to the ADC 316 of the controller 318. Accordingly, a strength of the RF field may be determined by reading an output of the ADC 316. The controller 318, configured to perform and/or execute the tag operations, for example, may send a confirmation to the first RFID tag in response to a determination that a signal transmitted by the first RFID tag is detectable by the second RFID tag. The second RFID tag may continue sending confirmations until the signal transmitted by the first RFID tag is no longer detectable.

In some embodiments, the RFID tags may swap roles to determine the distance between the first and second RFID tags in an opposite direction. For example, the second RFID tag may become the transmitting tag and the first RFID tag may become the receiving tag. In such a scenario, upon establishing communication with the first RFID tag, the controller 318 may transmit a plurality of signals sequentially to the first RFID tag. The signals may be backscatter signals generated from modulation of the RF field, where each signal may be transmitted to the first RFID tag at a reduced depth of amplitude modulation compared to a respective previous signal. For example, the first RFID tag may modulate the RF field by shorting out the antenna 302 with a modulator, such as an antenna shunting transistor (Q1) 326, which switches between high and low impedance. At least one of the I/O ports 324 may output data bits 328 which drive a base of the antenna shunting transistor (Q1) 326.

The depth of amplitude modulation of each transmitted signal may be varied by imposing a higher speed pattern on the antenna shunting transistor (Q1) 326. For example, at least one of the 1 I/O ports 324 of the controller 318 may generate a pattern of pulses for a PWM to be superimposed on the antenna shunting transistor (Q1) 326, where a timing of the PWM may be generated by software in the controller 318. The PWM may be received by the antenna shunting transistor (Q1) 326 causing a duty cycle (that is, an "on" time) of the antenna shunting transistor (Q1) 326 to be varied based on the PWM. For example, the antenna shunting transistor (Q1) 326 may be 50% on by superimposing a high speed pattern of alternating ones and zeroes, where a switching pattern of about one megahertz may be used to pulse width modulate the antenna shunting transistor (Q1) 326 resulting in chopped data bits 330. As illustrated, the base of the antenna shunting transistor (Q1) 326 may be gated by a second modulator (Q2) 332. A base of the second modulator (Q2) 332 may be driven by the PWM signal (that is, the chopped data bits 330) from at least one of the I/O ports 324.

By varying the duty cycle of the antenna shunting transistor (Q1) 222 through superimposition of the PWM, the amount of amplitude modulation applied to each transmitted signal may be varied, and as such, the depth of amplitude modulation may be varied. The second RFID tag may receive a confirmation from the first RFID tag following the transmission of each signal that indicates the signal transmitted by the second RFID tag is detectable by the first RFID tag. In response to a failure to receive the confirmation from the first RFID tag, the controller may identify a last transmitted signal for which a confirmation was received as a minimum detectable signal by the first RFID tag. The distance between the first and second RFID tags may then be determined based on the minimum detectable signal. In some examples, the distances determined based on the minimum detectable signal by the second RFID tag and the minimum detectable signal by the first RFID tag may be averaged.

Figure 4:
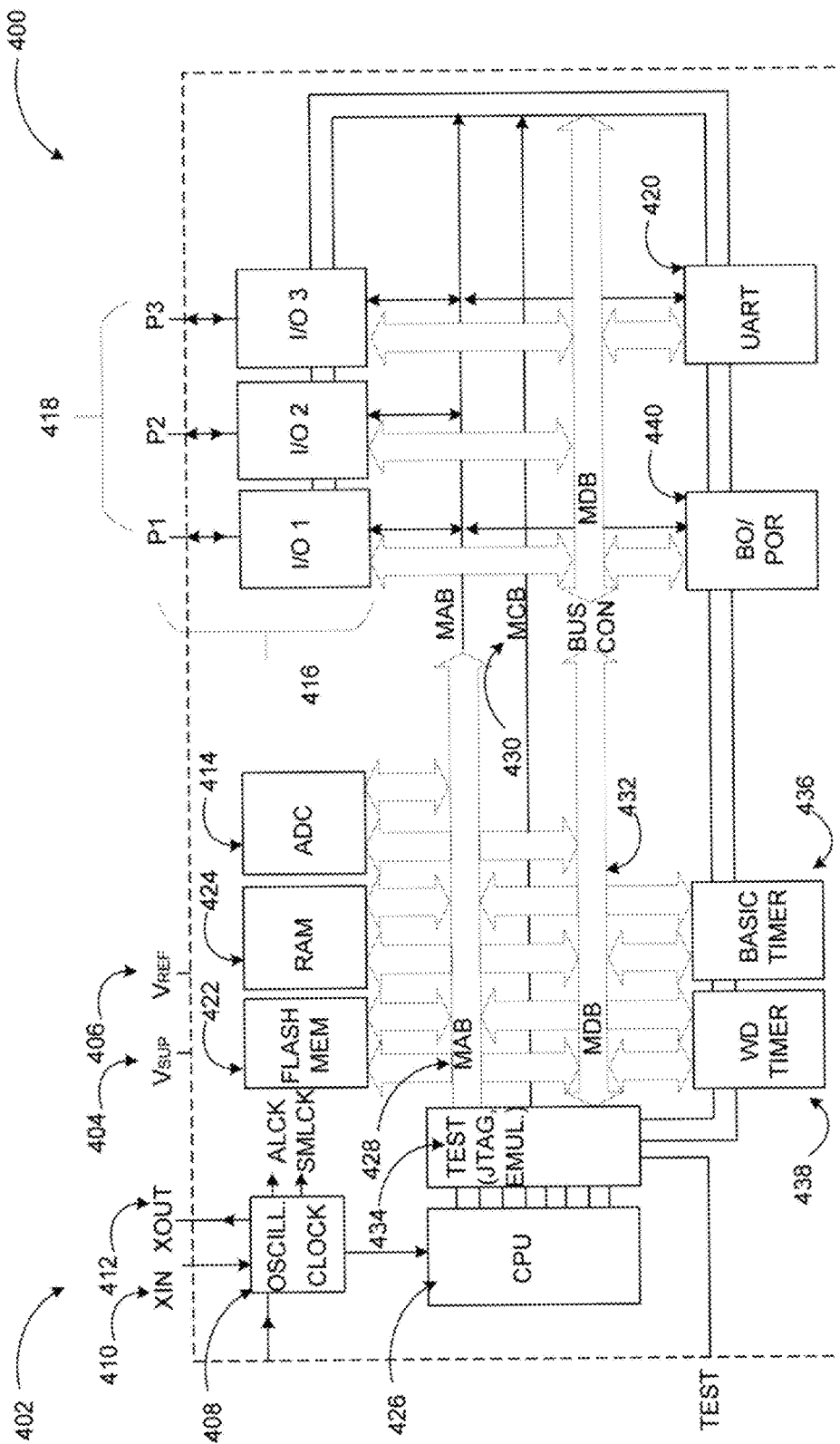
FIG. 4 illustrates an example microcontroller of an RFID tag.

FIG. 4 illustrates an example microcontroller of an RFID tag, arranged in accordance with at least some embodiments described herein.

As shown in a diagram 400, a controller 402 of an RFID tag may be an ultra-low power microcontroller configured to perform tag operations using stored energy extracted from an RF field. For example, the controller 402 may be configured to operate with a 1.8 Volt supply voltage and 200 micro amps. The controller 402 may include one or more power supply ports, such as a port associated with a supply voltage 404 and a port associated with a reference voltage 406. The controller 402 may also include an ADC 414. In some examples, the extracted energy from the RF field may be rectified to a direct current (DC). A branch of a DC circuit of the RFID tag may have a small capacitor to cause the voltage to follow an amplitude of the RF field, which may serve as input to the ADC 414 of the controller 402. As such, a strength of the RF field may be determined by reading an output of the ADC 414. The controller 402 may further include an oscillator 408. The oscillator 408 may be an electronic oscillator circuit configured to convert the DC to an alternating current (AC) signal, which may serve as a clock signal that regulates the RFID tag to cause one or more circuits of the RFID tag to be synchronized. The oscillator may be associated with an input 410 configured to receive the DC, and an output 412 configured to output the AC signal. In some examples, the oscillator may be a crystal oscillator that uses a mechanical resonance of a vibrating crystal of piezoelectric material to create the AC signal.

The controller 402 may include a serial communication module comprising one or more serial and parallel I/O ports 416 and associated pins 418, where each pin may be configured as either input or output. At least one of the I/O ports 416 may output data bits through a respective associated pin 418, which drive a base of a modulator of the RFID tag. A uART 420 may be configured to enable transmission of the individual data bits in a sequential fashion to the modulator, where the uART 420 may translate data between parallel and serial forms. In some embodiments, at least one of the I/O ports 416 of the controller 402 may generate a pattern of pulses for a PWM to be superimposed on the modulator, where a timing of the PWM may be generated by software of the controller 402, for example. The PWM may be received by the modulator causing a duty cycle of the modulator to be varied based on the PWM. By varying the duty cycle of the modulator through superimposition of the PWM, a depth of amplitude modulation may be varied for each signal transmitted by the controller 402. For example, the depth of amplitude modulation for each signal transmitted may be reduced compared to a respective previous signal.

In addition to the above-discussed components, the controller 402 may include a flash memory 422 and a RAM 424 configured to store data associated with the RFID tag. The controller 402 may also include various other components, such as a computer processing unit (CPU) 426, and one or more buses (for example, a memory address bus (MAB) 428, a memory control bus (MCB) 430, and a memory data bus (MDB) 432) that the CPU 426 may use to perform the tag operations. The CPU 426 may also be associated with a test module 434 that includes one or more emulators and/or Joint Test Action Group (JTAG) based software debuggers. The controller may further include various timers, such as a basic timer 436 and a watchdog timer 438, and brownout reset circuitry 440 that may reset the controller by triggering a power-on reset (POR) signal when power is applied or removed in response to detecting low supply voltages. The configuration and components of the controller 402 illustrated in FIG. 4 are merely illustrative, and are not limited to the examples disclosed herein.

Figure 5:
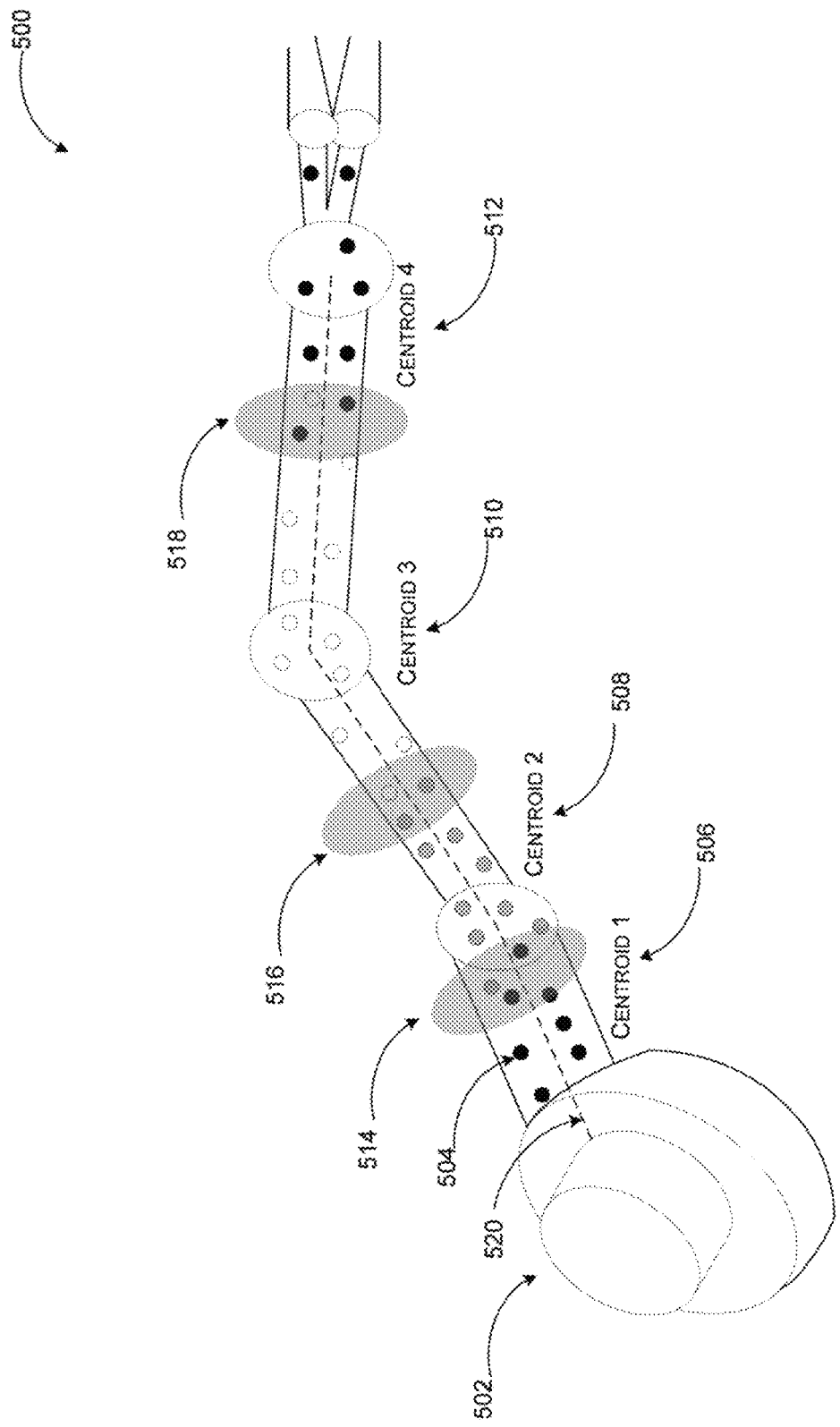
FIG. 5 illustrates an example robotic arm implementing a system configured to determine a distance between RFID tags.

FIG. 5 illustrates an example robotic arm implementing a system configured to determine a distance between RFID tags, arranged in accordance with at least some embodiments described herein.

As shown in a diagram 500, a robotic arm 502 may comprise a plurality of RFID tags, such as RFID tag 504, along a pathway 520 of the robotic arm 502. Each of the RFID tags may determine a distance between the RFID tag and one or more neighboring RFID tags. For example, an RFID tag (a transmitting tag) may modulate an irradiating electromagnetic field to generate backscatter signals that are transmitted sequentially to another neighboring RFID tag (a receiving tag). In some embodiments, the backscatter signals may be continuously generated. A depth of amplitude modulation of each transmitted signal may progressively be reduced until the other RFID tag can no longer detect the modulation, where a last transmitted signal detected by the other RFID tag may be identified as the minimum detectable signal by the other RFID tag. In some embodiments, the RFID tags may exchange roles, to cause the other RFID tag to be the transmitting tag and the RFID tag to be the receiving tag, to determine a minimum detectable signal by the RFID tag. The RFID tags may communicate the minimum detectable signals to an associated RFID reader. The reader may be configured to determine a strength for each of the minimum detectable signals, average the determined strength of each of the minimum detectable signals, and convert the averaged strength to units of distance to define the distance between the RFID tags based on the minimum detectable signal in the opposite direction.

The RFID tags may then cluster together based on the determined distances to establish multiple centroids (for example, 506, 508, 510, and 512), where one or more RFID tags of one centroid may overlap with one or more RFID tags of another centroid. For example, a first overlap region 514 between a first centroid 506 and a second centroid 508 may include RFID tags clustered within the first centroid 506 and second centroid 508. A second overlap region 516 between the second centroid 508 and a third centroid 510 may include RFID tags clustered within the second centroid 508 and the third centroid 510. A third overlap region 518 between the third centroid 510 and a fourth centroid 512 may include RFID tags clustered within the third centroid 510 and the fourth centroid 512. A distance between each of the centroids may be a vector and/or axis of the robotic arm 502, where a position of the vector and/or axis in a 3D) space may be frequently monitored to indicate motion and position of an object in the 3D space.

The ability of the RFID tags to harvest and store energy from an RF field for use in powering tag operations, such as the distance determination, may be valuable as the robotic arm 502 may require no external power source and/or wiring coupled to the robotic arm 502. Furthermore, redundancy may be introduced by simply increasing a number of RFID tags deployed. As sensors may be invisible and the deployment does not require any external connections, any number of RFID tags may be deployed. In an example scenario, a position of one or more moving items, such as parts and/or packages may be determined in assembly or conveyor based systems implementing the above-described robotic arm 502.

In other embodiments, the RFID system may be implemented in wearable technology to determine a motion and/or position of one or more limbs of a gymnast, a dancer, and/or a runner, for example. Furthermore, an RFID system may be implemented in security and/or tracking systems for monitoring movement of items. For example, electronic money, such as credit cards and debit cards, among other examples, may benefit from the implementation of the RFID system to enhance security. In an example scenario, a credit card may be embedded with an RFID tag, which may be subjected to a continuous wave (CW) RF signal to power the tag (emitted by an external field generator and/or a reader). The RFID tag in the credit card (or similar cards such as identification cards) may be enabled to communicate with other RFID tags in other cards or devices. For example, a mobile phone that includes one of the other RFID tags may be enabled to validate a wallet associated with the credit card at a point of sale (POS) location. To further the example scenario, the RFID tag in the mobile phone may communicate with the RFID tag in the credit card and a third RFID tag embedded to a POS machine validating the credit card to a POS system (e.g., the RFID) tag in the POS machine may, upon validation by the RFID tag in the mobile phone, trigger a sensor or provide validation information to an RFID reader associated with the POS system and the POS system may enable the POS machine to read the credit card).

The examples in FIGS. 1 through 5 have been described using specific configurations of RFID tags and readers, and systems for distance determination between two or more RFID tags. Embodiments for distance determination between two or more RFID tags are not limited to the specific devices, configurations, and systems according to these examples.

Figure 6:
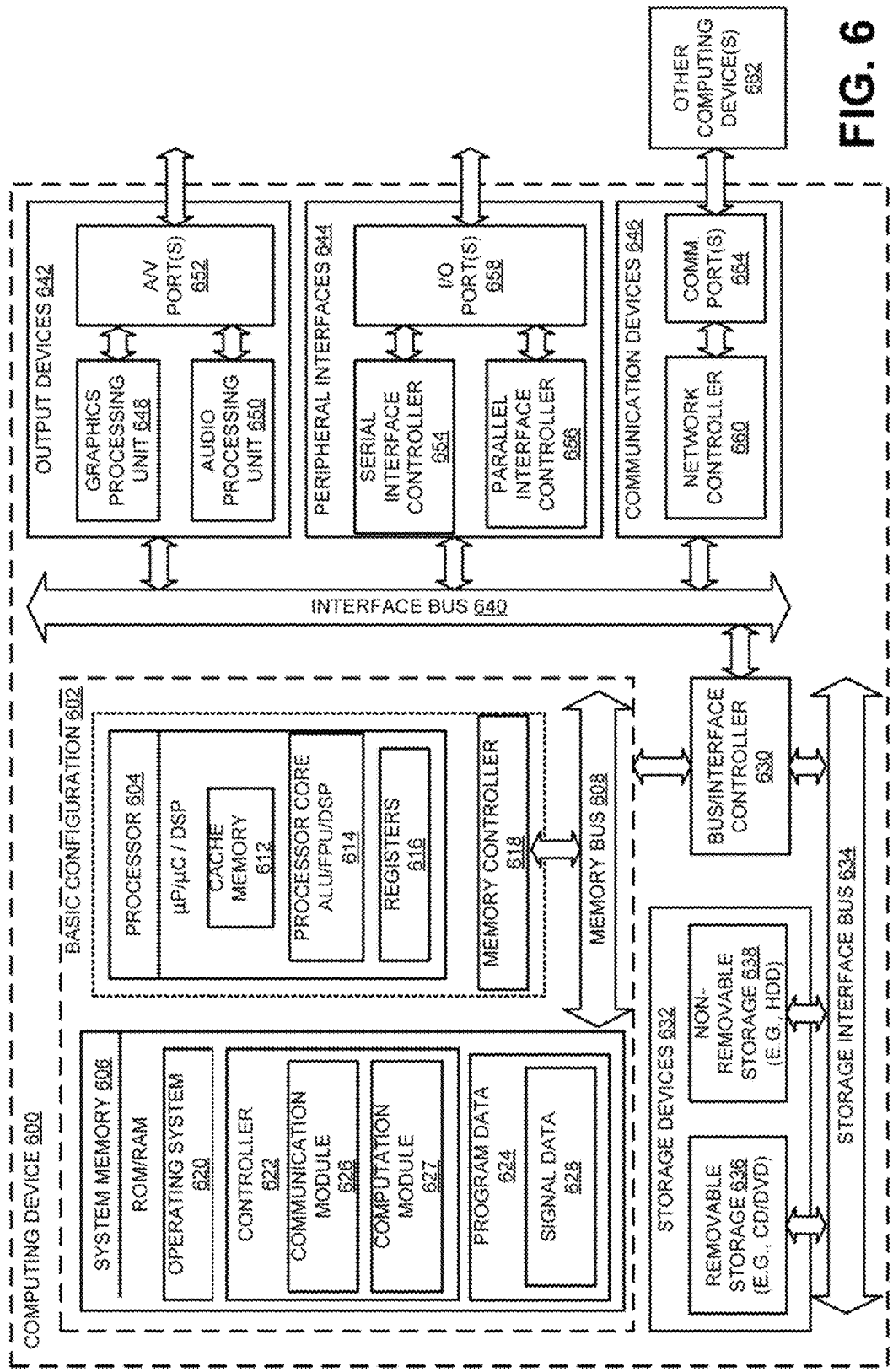
FIG. 6 illustrates a general purpose computing device, which may be associated with a reader communicatively coupled to one or more RFID tags.

FIG. 6 a general purpose computing device, which may be associated with a reader communicatively coupled to one or more RFID tags, arranged in accordance with at least some embodiments described herein.

For example, the computing device 600 may be used as a server, desktop computer, portable computer, smart phone, special purpose computer, or similar device such as a controller, a new component, a cluster of existing components in an operational system including a vehicle and a smart dwelling. In an example basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one or more levels of caching, such as a cache memory 612, one or more processor cores 614, and registers 616. The example processor cores 614 may (each) include an arithmetic logic unit (ALU), a floating point unit (FPU), a digital signal processing core (DSP core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a controller application 622, and program data 624. The controller application 622 may include a communication module 626 and a computation module 627, which may be an integral part of the application or a separate application on its own. The communication module 626 may be configured facilitate communication between the reader and a first RFID tag and/or a second RFID tag communicatively coupled to the reader. For example, the first RFID tag may communicate a minimum detectable signal by the second RFID tag, and/or the second RFID tag may communicate a minimum detectable signal by the first RFID tag to the reader through the communication module 626. The computation module 627 may be configured to determine a strength of each of the one or more minimum detectable signals, average the determined strength of each of the minimum detectable signals, and convert the averaged strength to units of distance to define a particular distance between the first RFID tag and the second RFID tag, as described herein. The program data 624 may include, among other data, signal data 628 related to the communicated signals from the first and second RFID tags, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 646 includes a network controller 660, which may be arranged to facilitate communications with one or more other computing devices 662 over a network communication link via one or more communication ports 664. The one or more other computing devices 662 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods to determine a distance between RFID tags. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
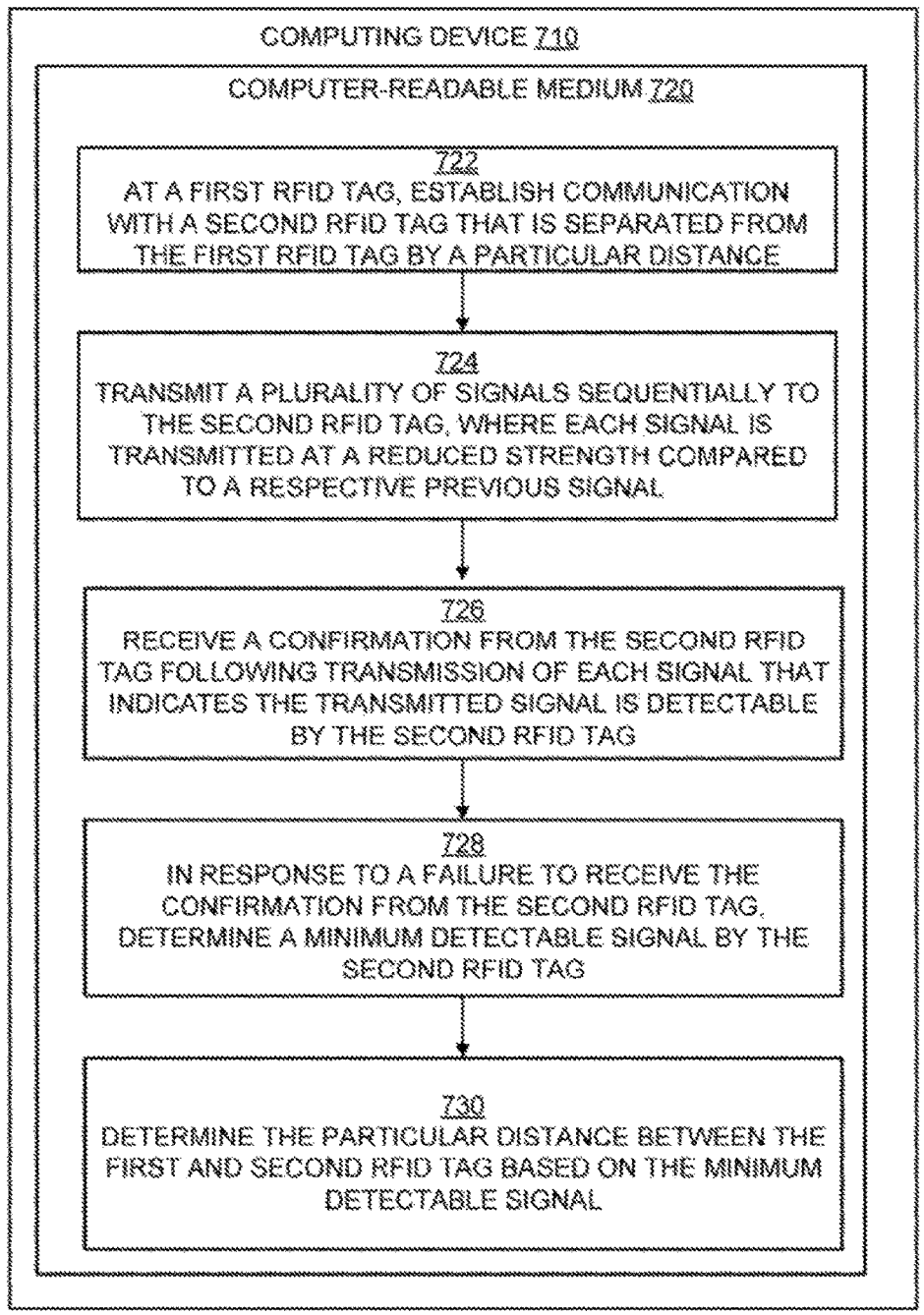
FIG. 7 is a flow diagram illustrating an example process to determine a distance between RFID tags that may be performed by a computing device such as the computing device in FIG. 6.

FIG. 7 is a flow diagram illustrating an example process to determine a distance between RFID tags that may be performed by a computing device such as the computing device in FIG. 6, arranged in accordance with at least some embodiments described herein.

Example methods may include one or more operations, functions or actions as illustrated by one or more of blocks 722, 724, 726, 728, and/or 730. The operations described in the blocks 722 through 730 may also be stored as computer-executable instructions in a computer-readable medium such as a computer-readable medium 720 of a computing device 710.

An example process to determine a distance between RFID tags may begin with block 722, "AT A FIRST RFID TAG, ESTABLISH COMMUNICATION WITH A SECOND RFID TAG THAT IS SEPARATED FROM THE FIRST RFID TAG BY A PARTICULAR DISTANCE," where a controller (for example, controller 210) of the first RFID tag (for example, first RFID tag 106) may establish communication with a second RFID tag (for example, second RFID tag 108), and the first and second RFID tags may agree to detect a minimum detectable signal. An antenna (for example, antenna 202) of the first RFID tag may be configured to receive an RF field (for example, RF field 104) generated by an external field generator, such as a reader (for example, reader 102) associated with the first and/or second RFID tags. A demodulator (for example, demodulator 204) of the first RFID tag may extract energy from the received RF field for powering tag operations, such as the establishment of the communication.

Block 722 may be followed by block 724, "TRANSMIT A PLURALITY OF SIGNALS SEQUENTIALLY TO THE SECOND RFID TAG, WHERE EACH SIGNAL IS TRANSMITTED AT A REDUCED STRENGTH COMPARED TO A RESPECTIVE PREVIOUS SIGNAL," where the controller of the first RFID tag may transmit a plurality of signals sequentially to the second RFID tag. In some examples, the signals may be backscatter signals generated from modulation of the RF field, where each signal may be transmitted at a reduced strength compared to a respective previous signal. For example, a depth of amplitude modulation at which each signal is transmitted may be progressively reduced, where the reduced depth of amplitude modulation may be achieved by employing a PWM to vary duty cycles of a modulator, such as antenna shunting transistor (for example, antenna shunting transistor (Q1) 222) of the first RFID tag.

Block 724 may be followed by block 726, "RECEIVE A CONFIRMATION FROM THE SECOND RFID TAG FOLLOWING THE TRANSMISSION OF EACH SIGNAL THAT INDICATES THE TRANSMITTED SIGNAL IS DETECTABLE BY THE SECOND RFID TAG," where the controller of the first RFID tag may receive a confirmation from the second RFID tag following the transmission of each signal that indicates the transmitted signal is detectable by the second RFID tag. For example, as each signal is transmitted with a reduced depth of amplitude modulation, the first RFID tag may ask the second RFID tag, "Can you still detect the modulation?" and the second RFID tag may respond with the confirmation.

Block 726 may be followed by block 728, "IN RESPONSE TO A FAILURE TO RECEIVE THE CONFIRMATION FROM THE SECOND RFID TAG, DETERMINE A MINIMUM DETECTABLE SIGNAL BY THE SECOND RFID TAG," where in response to a failure to receive the confirmation from the second RFID tag, the controller of the first RFID tag may identify a last transmitted signal for which a confirmation was received as a minimum detectable signal by the second RFID tag.

Block 728 may be followed by block 730, "DETERMINE THE PARTICULAR DISTANCE BETWEEN THE FIRST RFID TAG AND THE SECOND) RFID TAG BASED ON THE MINIMUM DETECTABLE SIGNAL," where the distance between the first and second RFID tags may be determined based on the minimum detectable signal. For example, the controller of the first RFID tag may communicate the minimum detectable signal to the reader, the communication facilitated by a communication module (for example, communication module 110) of the reader. A computation module (for example, computation module 112)) of the reader may then be configured to determine a strength of the minimum detectable signal and convert the strength to units of distance to define the particular distance between the first and second RFID tags. In some embodiments, the RFID tags may swap roles to cause the second RFID tag to be the transmitting tag and the first RFID tag to be the receiving tag in order to determine a minimum detectable signal by the first RFID tag, in a similar manner as described above. The second RFID tag may communicate the minimum detectable signal by the first RFID tag to the reader in addition to the first RFID communicating the minimum detectable signal by the second RFID tag. The reader may be configured to determine a strength for each of the minimum detectable signals, average the determined strength of each of the minimum detectable signals, and convert the averaged strength to units of distance to define the distance between the first and second RFID tags.

The blocks included in the above described process are for illustration purposes. Distance determination between RFID tags may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 8 illustrates a block diagram of an example computer program product, arranged in accordance with at least some embodiments described herein.

In some embodiments, as shown in FIG. 8, the computer program product 800 may include a signal bearing medium 802 that may also include one or more machine readable instructions 804 that, when executed by, for example, a processor, may provide the functionality described herein. Thus, for example, referring to the controller 402 in FIG. 4, CPU 426 may undertake one or more of the tasks shown in FIG. 8 in response to the instructions 804 conveyed to the controller 402 by the signal bearing medium 802 to perform actions associated with determination of a spectral profile of a sample as described herein. Some of those instructions may include, for example, one or more instructions to at a first RFID tag, establish communication with a second RFID tag that is separated from the first RFID tag by a particular distance, transmit a plurality of signals sequentially to the second RFID tag, where each signal is transmitted at a reduced strength compared to a respective previous signal, receive a confirmation from the second RFID tag following the transmission of each signal that indicates the transmitted signal is detectable by the second RFID tag, in response to a failure to receive the confirmation from the second RFID tag, determine a minimum detectable signal by the second RFID tag, and determine the particular distance between the first RFID tag and the second RFID tag based on the minimum detectable signal.

In some implementations, the signal bearing medium 802 depicted in FIG. 8 may encompass a computer-readable medium 806, such as, but not limited to, a hard disk drive (HDD), a solid state drive (SSD), a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (for example, a fiber optic cable, a waveguide, a wired communication link, a wireless communication link, etc.). Thus, for example, the computer program product 800 may be conveyed to one or more modules of the processor 604 of FIG. 6 by an RF signal bearing medium, where the signal bearing medium 802 is conveyed by the wireless communications medium 810 (for example, a wireless communications medium conforming with the IEEE 802.11 standard).

According to some examples, methods to determine a distance between RFID tags are provided. An example method includes at a first RFID tag, establishing communication with a second RFID tag that is separated from the first RFID tag by a particular distance, transmitting a plurality of signals sequentially to the second RFID tag, where each signal is transmitted at a reduced strength compared to a respective previous signal, and receiving a confirmation from the second RFID tag following the transmission of each signal that indicates the transmitted signal is detectable by the second RFID tag. The example method further includes in response to a failure to receive the confirmation from the second RFID tag, identifying a last transmitted signal for which a confirmation was received as a minimum detectable signal by the second RFID tag, and determining the particular distance between the first RFID tag and the second RFID tag based on the minimum detectable signal.

In other examples, a depth of amplitude modulation of each signal may be reduced from the respective previous signal. A pulse width modulation may be employed to vary duty cycles of a modulator of the first RFID tag to reduce the depth of amplitude modulation of each signal from the respective previous signal. The depth of the amplitude modulation may be characterized as a function of field power. The establishment of communication with the second RFID tag at the first RFID tag may include enabling the first RFID tag and the second RFID tag to agree to detect the minimum detectable signal.

In further examples, in response to the failure to receive the confirmation from the second RFID tag, the last transmitted signal for which a confirmation was received from the second RFID tag may be re-transmitted. The last transmitted signal for which the confirmation was received from the second RFID tag may be communicated as the minimum detectable signal to a reader. The first RFID tag and the second RFID tag may be passive RFID tags.

According to some embodiments, RFID tags may be described. An example RFID tag may include an antenna configured to receive a RF field generated by an external field generator, a demodulator configured to extract energy for tag operations from the received RF field, and a controller. The controller may be configured to establish communication with another RFID tag that is separated from the RFID tag by a particular distance, transmit a plurality of signals sequentially to the other RFID tag, where each signal is transmitted at a reduced depth of amplitude modulation compared to a respective previous signal, and receive a confirmation from the other RFID tag following the transmission of each signal that indicates the transmitted signal is detectable by the other RFID tag. The controller may also be configured to identify a last transmitted signal for which a confirmation was received as a minimum detectable signal by the other RFID tag in response to a failure to receive the confirmation from the other RFID tag, and determine the particular distance between the RFID tag and the other RFID tag based on the minimum detectable signal.

In other embodiments, the controller may be further configured to generate a pulse width modulation using the energy from the RF field. The example RFID tag may further include a modulator configured to receive the pulse width modulation, and vary a duty cycle based on the received pulse width modulation such that the depth of amplitude modulation of each of the plurality of signals transmitted to the other RFID tag is varied. The modulator may be an antenna shunting transistor.

According to some examples, systems to determine a distance between radio frequency identification (RFID) tags are described. An example system may include a reader, a first RFID tag, and a second RFID tag. The first RFID tag may include a first antenna configured to receive a radio frequency (RF) field, a demodulator configured to extract energy for tag operations from the received RF field, and a first controller. The first controller may be configured to establish communication with a second RFID tag that is separated from the first RFID tag by a particular distance, transmit a plurality of signals sequentially to the second RFID tag, where each signal is transmitted at a reduced depth of amplitude modulation compared to a respective previous signal, and receive a confirmation from the second RFID tag following the transmission of each signal that indicates the transmitted signal is detectable by the second RFID tag. The first controller may also be configured to identify a last transmitted signal for which a confirmation was received as a minimum detectable signal by the second RFID tag in response to a failure to receive the confirmation from the second RFID tag, and determine the particular distance between the first RFID tag and the second RFID tag based on the minimum detectable signal. The second RFID tag may include a second antenna configured to receive the RF field and the plurality of signals transmitted from the first RFID tag at varying depths of amplitude modulation, and a second controller configured to send the confirmation to the first RFID tag in response to a determination that the transmitted signal is detectable by the second RFID tag.

In other examples, the system may be integrated within a robotic arm. The system may also include an external field generator configured to generate the RF field, where the first RFID tag and the second RFID tag may be bathed in the RF field generated by the external field generator or the reader. The second controller may be further configured to transmit another plurality of signals sequentially to the first RFID tag, where each signal is transmitted at a reduced depth of amplitude modulation compared to a respective previous signal, receive a confirmation from the first RFID tag following the transmission of each signal that indicates the transmitted signal is detectable by the first RFID tag, identify a last transmitted signal for which a confirmation was received as a minimum detectable signal by the first RFID tag in response to a failure to receive the confirmation from the first RFID tag, and determine the particular distance between the first RFID tag and the second RFID tag based on the minimum detectable signal.

In further examples, the first RFID tag may be configured to communicate the minimum detectable signal by the second RFID tag to the reader, and the second RFID tag may be configured to communicate the minimum detectable signal by the first RFID tag to the reader. The reader may be configured to determine a strength of each of the minimum detectable signals, average the determined strength of each of the minimum detectable signals, and convert the averaged strength to units of distance to define the particular distance.

While various compositions, methods, systems, and devices are described in terms of "comprising" various components or steps (interpreted as meaning "including, but not limited to"), the compositions, methods, systems, and devices can also "consist essentially of" or "consist of" the various components and steps, and such terminology should be interpreted as defining essentially closed-member groups."

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware would be possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be possible from the foregoing descriptions. Such modifications and variations are intended to fall within the scope of the appended claims. The present disclosure includes the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, etc.; and a transmission type medium such as a digital and/or an analog communication medium (for example, a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to determine a distance between radio frequency identification (RFID) tags, the method comprising:
    at a first RFID tag:
        establishing a communication with a second RFID tag that is separated from the first RFID tag by a particular distance;
        transmitting a plurality of signals sequentially to the second RFID tag, wherein each signal is transmitted at a reduced strength compared to a respective previous signal;
        receiving a confirmation from the second RFID tag following the transmission of each signal, wherein the confirmation indicates that the transmitted signal is detectable by the second RFID tag;
        in response to a failure to receive the confirmation from the second RFID tag:
            identifying a last transmitted signal, for which the confirmation was received, as a minimum detectable signal by the second RFID tag; and
            re-transmitting the last transmitted signal, identified as the minimum detectable signal, to the second RFID tag; and
        determining the particular distance between the first RFID tag and the second RFID tag based on the minimum detectable signal.

2. The method of claim 1, wherein transmitting each signal at the reduced strength compared to the respective previous signal comprises:
    reducing a depth of amplitude modulation of each signal from the respective previous signal.

3. The method of claim 2, wherein reducing the depth of the amplitude modulation of each signal from the respective previous signal comprises:
    employing a pulse width modulation to vary duty cycles of a modulator of the first RFID tag.

4. The method of claim 2, wherein the depth of the amplitude modulation is characterized as a function of field power.

5. The method of claim 1, wherein establishing the communication with the second RFID tag at the first RFID tag comprises:
    enabling the first RFID tag and the second REID tag to agree to detect the minimum detectable signal.

6. The method of claim 1, further comprising:
    communicating the last transmitted signal, for which the confirmation was received from the second RFID tag, as the minimum detectable signal to a reader.

7. The method of claim 1, wherein the first RFID tag and the second RFID tag are passive RFID tags.

8. A radio frequency identification (RFID) tag, the RFID tag comprising:
    an antenna configured to receive radio frequency (RF) field generated by an external field generator;
    a demodulator configured to extract energy for tag operations from the received RF field; and a controller configured to:
  establish a communication with another RFID tag that is separated from the RFID tag by a particular distance;
  transmit a plurality of signals sequentially to the other REID tag, wherein each signal is transmitted at a reduced depth of amplitude modulation compared to a respective previous signal;
  receive a confirmation from the other RFID tag following the transmission of each signal, wherein the confirmation indicates that the transmitted signal is detectable by the other RFID tag;
  in response to a failure to receive the confirmation from the other RFID tag:
    identify a last transmitted signal, for which the confirmation was received, as a minimum detectable signal by the other RFID tag; and
    re-transmit the last transmitted signal, identified as the minimum detectable signal, to the second RFID tag; and
  determine the particular distance between the RFID tag and the other RFID tag based on the minimum detectable signal.

9. The RFID tag of claim 8, wherein the controller is further configured to generate a pulse width modulation using the energy from the RF field.

10. The RFID tag of claim 9, further comprising a modulator configured to:
  receive the pulse width modulation; and
  vary a duty cycle based on the received pulse width modulation such that the depth of the amplitude modulation of each signals transmitted to the other RFID tag is varied.

11. The RFID tag of claim 10, wherein the modulator includes an antenna shunting transistor.

12. A system to determine a distance between radio frequency identification (RFID) tags, the system comprising:
  a reader;
  a first RFID tag comprising:
    a first antenna configured to receive a radio frequency (RF) field;
    a demodulator configured to extract energy for tag operations from the received RF field; and
    a first controller configured to:
      establish a communication with a second RFID tag that is separated from the first RFID tag by a particular distance;
      transmit a plurality of signals sequentially to the second RFID tag, wherein each signal is transmitted at a reduced depth of a first amplitude modulation compared to a respective previous signal;
      receive a first confirmation from the second RFID tag following the transmission of each signal, wherein the first confirmation indicates that the transmitted signal is detectable by the second RFID tag;
      in response to a failure to receive the first confirmation from the second REID tag, identify a last transmitted signal for which the first confirmation was received as a first minimum detectable signal by the second RFID tag;
      communicate the last transmitted signal, identified as the first minimum detectable signal, to the reader; and
      determine the particular distance between the first RFID tag and the second RFID tag based on the first minimum detectable signal; and
  the second RFID tag comprising:
    a second antenna configured to receive the RF field and the plurality of signals transmitted from the first RFID tag at varying depths of the first amplitude modulation; and
    a second controller configured to send the first confirmation to the first RFID tag in response to a determination that the transmitted signal is detectable by the second RFID tag.

13. The system of claim 12, wherein the system is integrated within a robotic arm.

14. The system of claim 12, further comprising:
  an external field generator configured to generate the RF field.

15. The system of claim 14, wherein the first RFID tag and the second RFID tag are bathed in the RF field generated by one of the external field generator or the reader.

16. The system of claim 12, wherein the second controller is further configured to:
  transmit another plurality of signals sequentially to the first RFID tag, wherein each signal, of the another plurality of signals, is transmitted at a reduced depth of a second amplitude modulation compared to a respective previous signal of the another plurality of signals;
  receive a second confirmation from the first RFID tag following the transmission of each signal of the another plurality of signals, wherein the second confirmation indicates that the transmitted signal, of the another plurality of signals, is detectable by the first RFID tag;
  in response to a failure to receive the second confirmation from the first RFID tag, identify a last transmitted signal, of the another plurality of signals, for which the second confirmation was received as a second minimum detectable signal by the first RFID tag; and
  determine the particular distance between the first RFID tag and the second RFID tag based on the second minimum detectable signal.

17. The system of claim 16, wherein the second RFID tag is configured to communicate the second minimum detectable signal by the first RFID tag to the reader.

18. The system of claim 17, wherein the reader is configured to:
  determine a strength of each of the first minimum detectable signal and the second minimum detectable signal.

19. The system of claim 18, wherein the reader is further configured to:
  average the determined strength of each of the first minimum detectable signal and the second minimum detectable signal; and
  convert the averaged strength to units of distance to define the particular distance.

* * * * *

UNITED STATES PATENT AND TRADEMARK OFFICE
CERTIFICATE OF CORRECTION

| | | |
|---|---|---|
| PATENT NO. | : 9,767,330 B2 | Page 1 of 1 |
| APPLICATION NO. | : 14/801538 | |
| DATED | : September 19, 2017 | |
| INVENTOR(S) | : Roberts | |

It is certified that error appears in the above-identified patent and that said Letters Patent is hereby corrected as shown below:

In the Specification

In Column 3, Line 12, delete "pan" and insert -- part --, therefor.

In Column 5, Line 29, delete "examples. The" and insert -- examples, the --, therefor.

In Column 10, Line 29, delete "3D)" and insert -- 3D --, therefor.

In Column 10, Line 65, delete "RFID)" and insert -- RFID --, therefor.

In Column 14, Line 28, delete "SECOND)" and insert -- SECOND --, therefor.

In the Claims

In Column 20, Line 54, in Claim 5, delete "REID" and insert -- RFID --, therefor.

In Column 21, Line 6, in Claim 8, delete "REID" and insert -- RFID --, therefor.

In Column 21, Line 32, in Claim 10, delete "signals" and insert -- signal --, therefor.

In Column 21, Line 59, in Claim 12, delete "REID" and insert -- RFID --, therefor.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*